May 26, 1970 G. T. WEBB 3,514,729
PULSE GENERATING SWITCH DEVICE
Filed Jan. 14, 1969
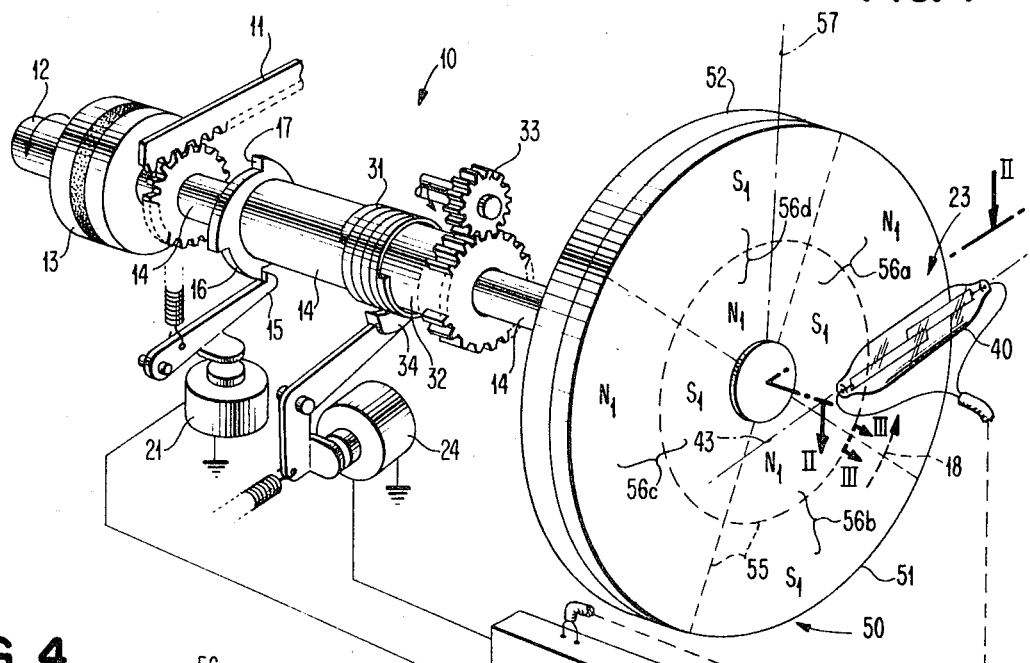
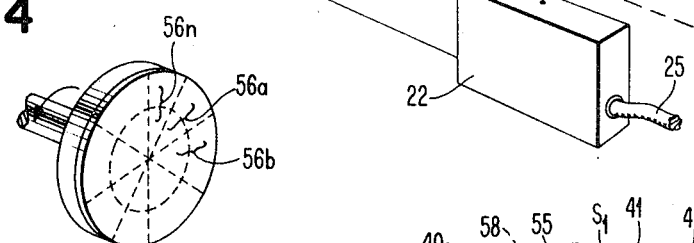
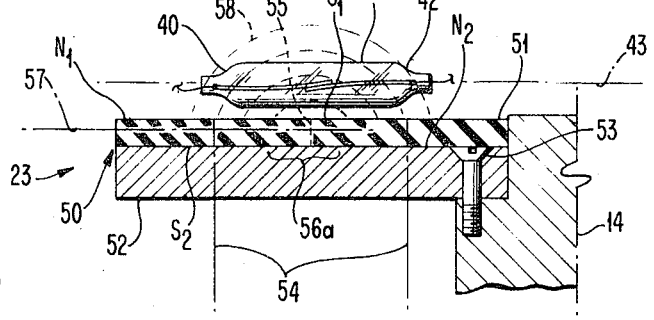
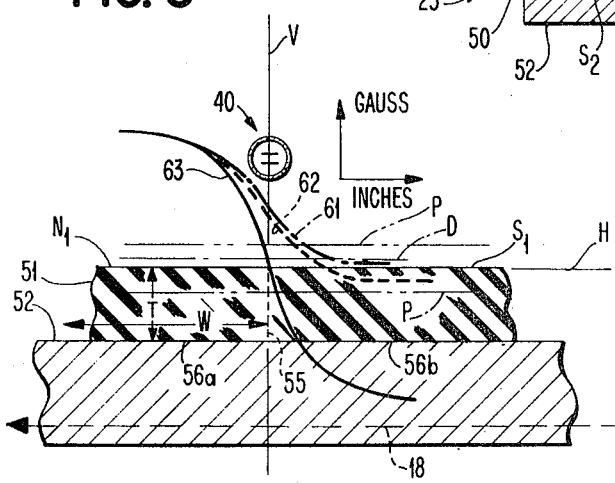
INVENTOR
GEORGE T. WEBB
BY E. Ronald Coffman
ATTORNEY.

United States Patent Office 3,514,729
Patented May 26, 1970

3,514,729
PULSE GENERATING SWITCH DEVICE
George T. Webb, Austin, Tex., assignor to International Business Machines Corporation, Armonk, N.Y., a corporation of New York
Filed Jan. 14, 1969, Ser. No. 790,954
Int. Cl. H01h 1/66; H01f 7/02
U.S. Cl. 335—207                        13 Claims

ABSTRACT OF THE DISCLOSURE

Sequential pulses are generated by opening a normally closed magnetically operable reed switch as it passes transitions between equally strong oppositely directed magnetic fields. Closely adjacent equal fields provide a precise field change for controlling switch transfer in a manner that is highly tolerant of stray fields.

DISCLOSURE OF THE INVENTION

Magnetically actuatable reed switches have been proposed for use in generating pulses indicative of the motion or position of a part. This application for a reed switch takes advantage of the magnetic coupling between the moving part and the normally stationary switch. The basic function of selectively opening and closing the contacts of a reed switch can be performed by any simple flux source capable of generating an adequate flux extending along the longitudinal axis of the switch. When the switch is in the presence of such a field, its contacts will close, and when the field is sufficiently reduced the contacts will open.

My invention provides a specific flux source capable of insuring both an adequately high switch closing flux and an adequately low switch opening flux at precise geometrical locations which are relatively unaffected by the presence of stray fields, such as those generated by motor armatures, or even by the earth's magnetic field. With my invention, it is possible to obtain positioning control of relatively high resolution with relatively simple equipment.

The flux source of my invention basically involves adjacent flux sources of opposite polarity and equal strength. The close adjacency of the flux sources and the reverse polarity thereof combine to produce a maximum interference between the fields resulting in a relatively high rate of flux change with distance. Accordingly, a stray field that changes the flux datum of a system does not greatly affect the geometrical location of the point where the switch transfer flux level is attained.

Furthermore, the equal strength of the fields causes the maximum rate of flux change to occur symmetrically within the range of the switch transfer flux level which is close to zero flux.

Should the magnetic fields differ substantially in magnitude, the region of maximum precision, i.e. of most rapid flux change, will be separated from the region of switching flux level, i.e. flux close to zero. The result is a loss of the maximum potential precision otherwise obtainable by the field interference. An additional benefit derived by the use of opposite equal fields is the freedom to make the fields arbitrarily large. It has been found that larger fields produce sharper and hence more precise transitions.

These and other objects, features and advantages of my invention will be more apparent to those skilled in the art from the following description of several preferred illustrative embodiments of my invention wherein reference is made to the accompanying drawings of which:

FIG. 1 is a perspective view of a positioning mechanism employing a reed switch device constructive in accordance with my invention as a control feedback therein:

FIG. 2 is a partial cross-sectional view of the reed switch device shown in FIG. 1 taken along lines II—II thereof;

FIG. 3 is an enlarged fragmental cross-sectional view taken along lines III—III of FIG. 1 showing a portion of the reed switch device with a graphical representation of comparative magnetic flux distributions superimposed thereon; and FIG. 4 is a perspective view of a high resolution flux generator showing an extension of the benefits of my invention.

Returning now more specifically to the drawings, in FIG. 1 there is shown a positioning system 10 for longitudinally displacing an output member 11. The system employs a constantly rotating input shaft 12 which drives a motion control shaft or reference member 14 through a slipping friction clutch 13 when shaft 14 is released for rotation by displacement of a pawl 15 from control ratchet 16. Control of pawl 15 is accomplished through electromagnet 21, electrical control circuitry 22 and a magnetically operable pulse generating switch device 23.

Output member 11 can be also driven rightwardly by clockwise rotation of shaft 14 through engagement of a normally disengaged spring clutch 31 to reverse-input shaft 32 which is in constant clockwise rotation as driven by input gear 33. Clutch 31 is engaged by activation of electromagnet 24 which pivots pressure shoe 34 against the spring clutch 31 causing the spring to wrap down on shaft 32. Electromagnet 24 also is controlled by control circuitry 22 and the switch device 23. Slipping clutch 13 permits simultaneous drive inputs to shaft 14 without breakage of parts. During clockwise rotation of shaft 14, pawl 15 is simply cammed over the teeth 17 of the ratchet 16.

The switch device 23 includes a reed switch 40 and an improved switch actuating, position reference magnetic assembly 50 connected to, or otherwise forming part of shaft 14 for rotation therewith past the reed switch 40 as an indication of the position of output member 11.

Reed switch 40 is of any of many known constructions and includes a pair of overlapping, flexible, magnetically permeable contacts 41 encapsulated in a glass envelope 42 filled with an inert gas. The contacts 41 are biased to be normally out of engagement, but close in response to a magnetic field aligned with the common axis 43 along which the contacts 41 extend.

Assembly 50 preferably comprises a planar sheet 51 of a ceramic magnetic material such as barium ferrite which is characterized by a relatively high coercivity, e.g. 1,500–2,000 oersteds, which allows the use of thin material thereby minimizing demagnetization of adjacent oppositely polarized transverse sections. The magnetic sheet 51 is mounted on plate or disk 52 of a soft or low coercivity magnetic material such as steel (coercivity of about 5 oersteds). Disk 52 is connected to the shaft 14 by screws 53 as shown in FIG. 2. The sheet 51 is magnetized along lines 54 that are normal to switch axis 43, into a plurality of independently polarized sections having substantially common boundaries 55. The sections are grouped into pairs 56a, 56b, 56c, 56d oriented along radial lines 57 which are parallel to switch axis 43 when adjacent thereto. The magnetized sections of each pair such as 56a are oppositely polarized to provide an exposed north pole face $N_1$ and an exposed south pole face $S_1$ defining an air gap therebetween through which flux lines 58 extend for closing the contacts 41 of reed switch 40. The steel disk 52 provides a magnetic connection or shunt coupling between the unexposed north and south poles $N_2$ and $S_2$ respectively, of the magnetized sections to intensify the flux 58 available across the exposed pole faces $N_1$ and $S_1$ thereof and also to minimize the generation of stray fields around the outer edge of the sheet 51.

The reed switch contacts 41 are caused to open by driving the flux 58 to zero through the use of oppositely polarized section pairs 56a, 56b . . . as shown by the pole face notations in FIG. 1. Movement of sheet 51 along its rotational path 18 which is adjacent and normal to switch axis 43, brings the oppositely directed flux from sequentially adjacent section pairs 56a, 56b . . . into alignment with contacts 41. This charge of flux direction assures a precise transition point of about zero flux as more completely explained through the use of FIG. 3.

FIG. 3 shows the useful or reed-switch-operating flux level variations produced by magnetic material 51 in the region of the transition between adjacent magnetized section pairs 56a and 56b. The horizontal axis H indicates the relative effective location of the geometrical section boundary 55 and the reed switch 40 during movement along path 18. The vertical axis V indicates the magnetic field available to close the reed switch. Chain lines P show the flux level for picking or closing the switch and chain line D shows the flux level for dropping or opening the switch.

Curve 63 shows the relationship between field and displacement produced when adjacent section pairs 56a, 56b . . . are magnetized in accordance with my invention to have opposite polarity and substantially equal intensity. Curve 63 is characterized by its rapid decrease of flux in the zero or switching range of flux levels, i.e. P and D. Of course, a similar but inverted transitional curve will be produced at the next reversal of polarity. My invention is thus capable of indicating a large number of sequential positions as shown in FIG. 4 for example by an increased number of section pairs 56a, 56b . . . 56n. Note that the field begins to reduce to the left of boundary 55 by a distance approximately equal to the material thickness T. Accordingly, to obtain maximum benefit from the magnetic section pairs such as 56a, their transverse dimension or width W taken along the path 18 (see FIG. 3) should be greater than their thickness T.

Curves 61 and 62 illustrate the field displacement characteristics that would be produced if the right section pair 56b was not magnetized (curve 61) or was magnetized with opposite polarity to the left section pair but at an intensity insufficient to close the reed switch (curve 62). Curve 61 shows a flux level change that reaches a maximum at the geometrical boundary 55 and then decreases to become asymptotic with the zero flux level. Curve 62 is similar to curve 61 but defines a specific zero flux position. The maximum flux level change of curves 61 and 62 is substantially less than that of curve 63. Also, although the flux level for both curves 61 and 62 is reduced to below Drop line D, the displacement rate of flux level change at that point is substantially less than the maximum change rate of the curve. The effects of a stray field upon performance reliability of reed switch operation by the flux patterns thus described can be visualized by considering the intersection of Drop line D with flux level curves 61, 62 and 63. A stray field would have the effect of moving line D vertically up or down. It is thus apparent that a given stray field will cause less variation in the geometrical switch point, i.e. horizontal position of that intersection, in the presence of a field like curve 63 than in the presence of fields like those of curves 61 and 62. An important characteristic of my invention is the freedom it provides to make the strength of the magnetic sections arbitrarily large. The displacement rate of flux change of curve 63 can be increased by increasing the magnetic strength of adjacent section pairs 56a and 56b. Increasing the high level of magnetization of curves 61 or 62 will have the undesirable opposite effect of locating the switch transfer line intersections in a flatter part of the curve. Reducing the high level of magnetization of curves 61 or 62 brings the control flux level closer to the level of stray fields thereby also reducing reliability.

Operation of my invention can be summarized by narration of a typical sequence of events encountered in operation of the system shown in FIG. 1. When it is desired to move output member 11 to the left an input signal is delivered via cable 25 to control 22 identifying the desired movement distance. The directional information selects operation of solenoid 21 and the distance information is set into a counting device of conventional construction within the control 22 which will be decremented by signals from reed switch 40.

Assuming that it is desired to move output member 11 leftwardly by one increment, solenoid 21 will be selected to release ratchet 16 and shaft 14 for counterclockwise rotation. At the beginning of this rotation, the reed switch 40 is closed due to influence from its immediately adjacent magnetized section pair 56a. Rotation of shaft 14 causes the flux field created by the magnetic sheet 51 to reverse as magnetized section pair 56b becomes aligned with the reed switch axis 43. This reversal causes the reed switch 40 to open and later close. Opening of the reed switch 40 decrements the counter within the control 22 and, since only one unit of motion was desired, solenoid 21 is deactivated allowing pawl 15 to restore upwardly to intercept the next succeeding tooth 17 of the ratchet 16. Had leftward motion of six units been desired, magnet 21 would have remained activated until the reed switch 40 had opened six times to decrement the counter by the desired six units.

If it is desired to move the output member 11 rightwardly, the signal supplied to input cable 25 causes selection of solenoid 24 and again enters the number of units desired into the counter. Upon activation of solenoid 24, clutch shoe 34 causes spring clutch 31 to wrap down tightly on auxiliary input shaft 32, thereby causing auxiliary input 33 to drive ratchet 16 clockwise and move output member 11 to the right. As magnetic assembly 50 rotates past the reed switch 40, the reversal of magnetic field direction causes opening and closing of the reed switch as in the case of forward motion. Opening of the reed switch upon each transition decrements the counter and upon reaching zero, the counter deactivates solenoid 24 to release clutch 31 and decouple shaft 14 from shaft 32. Input shaft 12, acting through friction clutch 13, immediately begins to drive shaft 14 counterclockwise to the point where its motion is intercepted by pawl 15 engaging the first available tooth 17 of ratchet 16.

It will be understood that the system thus described is illustrative only and that a switch device constructed in accordance with my invention can be employed in various position indicating and feedback applications. For example, my invention can be constructed to directly indicate rectilinear positions by providing a rectilinear array of pairs of magnetized sections. Also, my invention can be employed to indicate desired motion limits by opening a reed switch as such a limit is approached or exceeded. Having thus described the concepts of my invention and a preferred embodiment illustrating its construction and application, I define the subject matter sought to be patented by the following claims.

I claim:

1. A magnetically operable switch device comprising a reed switch,
   a reference member movable relative to said reed switch along a path that passes adjacent thereto wherein the improvement comprises:
       said reference member including a magnetic assembly comprising magnetic material magnetized to provide an even number of at least four magnetic pole faces grouped in pairs that are positioned in close sequential adjacency along said path, the pole faces within each pair being of opposite polarity and oriented for establishing a magnetic flux therebetween of sufficient strength and direction to cause closure of said reed switch when aligned therewith, and the pole faces of each pair being oriented oppositely with respect to the pole faces of the pair sequentially adjacent thereto such that adjacent pairs of pole faces establish oppositely directed magnetic flux.

2. A switch device as defined in claim 1 wherein:

said magnetic assembly is provided by a single piece of magnetic material having a high coercivity, said pairs of pole faces are provided by magnetized portions of said magnetic material having a substantially common boundary therebetween, and said magnetic material has a thickness that is less than the width of said pole faces as measured by a transverse dimension that is aligned with said path.

3. A switch device as defined in claim 1 wherein said reference member further comprises a rotatable shaft and said path is defined by a point rotating about the axis of said shaft.

4. A switch device as defined in claim 1 wherein said number of pole faces is at least eight.

5. A positioning system comprising a source of controllable motion, an output member operatively connected thereto, and electrical means for controlling movement of said output member by said source of motion wherein the improvement comprises:

a switch device as defined by claim 1 wherein said reference member is operatively connected to said output member to reflect the position thereof, and said switch is electrically connected to said electrical means for controlling movement of said output member in response to the displacement thereof.

6. A magnetically operable switch device including a switch and a reference member movable relative to the switch along a path that passes adjacent to the switch, the switch having a pair of magnetically permeable contacts extending along a common axis oriented substantially normal to said path of relative motion, at least one of said contacts being resiliently biased to its position of non-engagement, wherein the improvement comprises:

said reference member including a magnetic assembly comprising magnetic material magnetized to provide an even number of at least four magnetic pole faces grouped in pairs that are positioned in close sequential adjacency along said path, the pole faces within each pair being oriented along a line parallel to said switch axis and being of opposite polarity for establishing a magnetic flux therebetween of sufficient strength to cause closure of said switch when aligned therewith, and the pole faces of each pair being oriented oppositely with respect to the pole faces of the pair sequentially adjacent thereto such that adjacent pairs of pole faces establish oppositely directed magnetic flux.

7. A switch device as defined in claim 6 wherein:

said magnetic assembly is provided by a single piece of magnetic material having a high coercivity, said pairs of pole faces are provided by magnetized portions of said magnetic material having a substantially common boundary therebetween, and said magnetic material has a thickness that is less than the width of said pole faces as measured by a transverse dimension that is aligned with said path.

8. A switch device as defined in claim 7 wherein said magnetized portions are each oriented along rectilinear axes normal to both said path and said switch axis.

9. A switch device as defined in claim 8 wherein said reference member further comprises a backing plate of a magnetically permeable material having a relatively low coercivity for supporting said single piece of magnetic material and for providing a magnetic connection between said magnetized portions.

10. A switch device as defined in claim 9 wherein all of said pole faces are coplanar.

11. A switch device as defined in claim 6 wherein said reference member further comprises a rotatable shaft and said path is defined by a point rotating about the axis of said shaft.

12. A switch device as defined in claim 6 wherein said number of pole faces is at least eight.

13. A positioning system comprising a source of controllable motion, an output member operatively connected thereto, and electrical means for controlling movement of said output member by said source of motion wherein the improvement comprises:

a switch device as defined by claim 6 wherein said reference member is operatively connected to said output member to reflect the position thereof, and said switch is electrically connected to said electrical means for controlling movement of said output member is response to the displacement thereof.

References Cited
UNITED STATES PATENTS

| | | | |
|---|---|---|---|
| 3,317,870 | 5/1967 | Bear | 335—207 |
| 3,434,084 | 3/1969 | Milligan | 335—284 |

BERNARD A. GILHEANY, Primary Examiner

R. N. ENVALL, Jr., Assistant Examiner

U.S. Cl. X.R.

335—302